US012645075B2

(12) United States Patent
Mills et al.

(10) Patent No.: US 12,645,075 B2
(45) Date of Patent: Jun. 2, 2026

(54) HEAD TRACKING SYSTEM

(71) Applicant: BAE SYSTEMS PLC, London (GB)

(72) Inventors: Colin Richard Mills, Rochester (GB); Simon Trythall, Rochester Kent (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/874,913

(22) PCT Filed: Jun. 1, 2023

(86) PCT No.: PCT/GB2023/051448
§ 371 (c)(1),
(2) Date: Dec. 13, 2024

(87) PCT Pub. No.: WO2023/242532
PCT Pub. Date: Dec. 21, 2023

(65) Prior Publication Data
US 2025/0362497 A1 Nov. 27, 2025

(30) Foreign Application Priority Data

Jun. 13, 2022 (EP) ..................................... 22275078
Jun. 13, 2022 (GB) ..................................... 2208576

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0172* (2013.01); *G02B 27/0176* (2013.01);
(Continued)

(58) Field of Classification Search
CPC ............ G02B 27/0093; G02B 27/0172; G02B 27/017; G02B 27/0176; G02B 27/1079;
(Continued)

(56) References Cited

U.S. PATENT DOCUMENTS

| | | |
|---|---|---|
| 6,377,401 B1 | 4/2002 | Bartlett |
| 9,874,931 B1 | 1/2018 | Koenck et al. |

(Continued)

FOREIGN PATENT DOCUMENTS

| | | |
|---|---|---|
| EP | 3073285 A1 | 9/2016 |
| WO | WO2023242532 A1 | 12/2023 |

OTHER PUBLICATIONS

Extended European Search Report received for EP Application No. 22275078.8, dated Nov. 2, 2022. 9 pages.
(Continued)

*Primary Examiner* — Cory A Almeida
(74) *Attorney, Agent, or Firm* — Arcane Law PLLC

(57) ABSTRACT

A head tracking system HTS, configured to determine a head position and a head orientation of a user to which display images are configured to align with the outside world scene and are configured to be presented, the HTS comprising: one or more optical sensors generating an optical measurement; and a number of inertial sensors generating an inertial measurement; a processor configured to determine the head position and the head orientation from one or both of the one or more optical sensors and the number of inertial sensors and configured to: determine an optical tracking state from the optical measurement and an inertial tracking state from the inertial measurement; when both the optical tracking state and the inertial tracking state are valid, flagging/asserting HTS operation as normal; when both the optical tracking state and the inertial tracking state are invalid, flagging/asserting HTS failure; when the optical tracking state and the inertial tracking state are valid comparing the optical measurement and the inertial measurement to determine if the HTS can operate safely based on a predetermined tracking performance required by the system.

20 Claims, 4 Drawing Sheets

(51) Int. Cl.
    *G06F 3/01*         (2006.01)
    *G06F 3/0346*     (2013.01)

(52) U.S. Cl.
    CPC ......... *G02B 27/0179* (2013.01); *G06F 3/012*
        (2013.01); *G06F 3/0346* (2013.01); *G02B*
        *2027/014* (2013.01); *G02B 2027/0181*
        (2013.01)

(58) Field of Classification Search
    CPC ...... G02B 2027/014; G02B 2027/0181; G06F
        3/012; G06F 3/0346
    See application file for complete search history.

(56)         References Cited

U.S. PATENT DOCUMENTS

| | | |
|---|---|---|
| 9,891,705 B1 | 2/2018 | Lahr et al. |
| 2018/0108179 A1* | 4/2018 | Tomlin .................. G06F 3/0346 |
| 2019/0041979 A1* | 2/2019 | Kirchner ............... B64D 43/00 |

OTHER PUBLICATIONS

Combined Search and Examination Report under Sections 17 and 18(3) received for GB Application No. 2208576.5, dated Oct. 11, 2022. 7 pages.
International Search Report and Written Opinion received for PCT Application No. PCT/GB2023/051448. Mail date: Aug. 9, 2023. 10 pages.

\* cited by examiner

HEAD TRACKING SYSTEM

FIELD

The present invention relates to a head tracking system.

BACKGROUND

A head tracking system is used to determine where a user's head is orientated and positioned based on platform and/or head mounted sensors and/or emitters and/or references. The head orientation and position data can be used to align imagery presented within a head worn display with reference to the real and/or virtual world. The head orientation and/or position data can also be utilised by other platform systems to control sensors and/or other equipment. The head tracking is generally based on the position of the user's head (XYZ) and the orientation (yaw, pitch and roll).

Head tracking systems use single and sometimes multiple head tracking techniques operating together to enhance the head orientation and/or position data using a combination of optical and inertial measurements. When both are used, the system is referred to as hybrid tracking. Having access to optical and inertial measurements provides an element of redundancy which can be used to improve the integrity of the head tracker output.

In certain situations where one or other sets of orientation and/or position measurements are not received or give erroneous information the use of the head orientation and/or position could lead to a hazardous situation. In addition when relying on inertial measurements alone, a scenario often referred to as coasting, there is a tendency for errors to accumulate. When relying on optical measurements alone the head tracking system will be unavailable when no optical solution can be realised.

A need exists for a head tracking system which overcomes at least some of the risks of unavailable head tracking data or elevated errors i.e. to overcome at least some of the current issues with known head tracking systems.

SUMMARY

According to an aspect of the present invention, there is provided a head tracking system HTS (100, 200), configured to determine a head position and a head orientation of a user to which display images are configured to align with the outside world scene and are configured to be presented, the HTS comprising: one or more optical sensors (112) generating an optical measurement; and a number of inertial sensors (104) generating an inertial measurement; a processor (114) configured to determine the head position and the head orientation from one or both of the one or more optical sensors and the number of inertial sensors and configured to: determine an optical tracking state from the optical measurement and an inertial tracking state from the inertial measurement; when both the optical tracking state and the inertial tracking state are valid, flagging/asserting HTS operation as normal; when both the optical tracking state and the inertial tracking state are invalid, asserting/flagging HTS failure; when the optical tracking state and the inertial tracking state are valid comparing the optical measurement and the inertial measurement to determine if the HTS can operate safely based on a predetermined tracking performance required by the system.

In an aspect, comparing the optical measurement and the inertial measurement comprises determining data associated with the inertial measurement to identify if the one or more inertial sensors has failed.

In an aspect, the number of inertial sensors comprises two or more inertial sensors and the processor is further configured to receive inertial measurements from two or more of the inertial sensors and use the inertial measurements, to identify if the number of inertial sensors has failed.

In an aspect, the number of inertial sensors comprises two or more inertial sensors and the processor is further configured to determine, for each inertial sensor in parallel, respective inertial measurement which are compared in a coasting mode to determine if the combined inertial measurement gives rise to a failure.

In an aspect, if the inertial measurement gives rise to a failure, generating a calculated head position and head orientation base on the optical measurement.

In an aspect, if the inertial measurement does not give rise to a failure, combining the inertial measurement with the optical measurement to generate a calculated head position and head orientation base on the optical measurement and the inertial measurement.

In an aspect, the number of inertial sensors (104) comprise three or more gyroscopes located on a head worn assembly associated with the HTS. Further, the number of inertial sensors may comprise four or more gyroscopes where two gyroscopes sense the same parameter to provide redundancy.

In an aspect, the one or more optical sensors (112) comprise optical sensors (112) in the vicinity of the HTS being configured to receive optical measurement from one or more light elements (110) located on a head worn assembly associated with the HTS. In alternate aspects, the optical sensors could be mounted on the head worn assembly, with the light elements mounted in the vicinity (e.g. mounted on a cockpit surface).

In an aspect, receive one or more measurements from sensors associated with a vehicle in which the HTS is used.

In an aspect, notify a vehicle control system that both the optical tracking state and the inertial tracking state are invalid.

In an aspect, incorporated into a head worn assembly such as a helmet.

In an aspect, present display images aligned with the outside world scene to a user based on a head position and a head orientation provided by the HTS of any preceding claim.

In an aspect, an optical display to display images aligned with the outside world scene to a user wearing the head worn assembly is provided, wherein the presentation of at least the virtual image is based on the optical tracking state and the inertial tracking state.

In an aspect, the optical display comprises at least one of a visor-projection display system, and a waveguide-based display, arranged to present virtual images such that they appear overlaid with a real world image through a visor or waveguide which forms part of the head worn assembly.

According to a second aspect there is provided a method to determine a head position and a head orientation of a user to which display images are configured to align with the outside world scene and are configured to be presented, the method comprising: determining an optical tracking state (306) from the optical measurement and an inertial tracking state from the inertial measurement; when both the optical tracking state and the inertial tracking state are valid (316), flagging/asserting HTS operation as normal; when both the optical tracking state and the inertial tracking state are invalid, flagging/asserting HTS failure (312); when one optical tracking state and the inertial tracking state are valid comparing the optical measurement and the inertial measurement to determine if the HTS can operate safely based on a predetermined tracking performance required by the system.

In an aspect, comparing the optical measurement and the inertial measurement comprises determining data associated with the inertial measurement to identify if any sensors has failed.

In an aspect, receiving multiple inertial measurements and determining the inertial measurements from two or more inertial sensors and using the inertial measurements, to identify if any of the inertial sensors has failed.

In an aspect, receiving multiple inertial measurements and comparing the multiple inertial measurements in a coasting mode to determine if the combined inertial measurement gives rise to a failure.

In an aspect, if the inertial measurement gives rise to a failure, generating a calculated head orientation based on the optical measurement.

In an aspect, if the inertial measurement does not give rise to a failure, combining the inertial measurement with the optical measurement to generate a head orientation based on the optical measurement and the inertial measurement.

In an aspect, the inertial measurement is received from two or more gyroscopes located on a head worn assembly associated with the HTS.

In an aspect, the optical measurement is received from optical sensors in the vicinity of the HTS being configured to receive optical measurement from one or more light elements located on a head worn assembly associated with the HTS.

In an aspect, receive one or more measurements from sensors associated with a vehicle in which the HTS is used.

In an aspect, notifying a vehicle control system that both the optical tracking state and the inertial tracking state are invalid.

BRIEF DESCRIPTION OF THE FIGURES

Embodiments of the invention will now be described by way of example only with reference to the figures, in which.

DETAILED DESCRIPTION

The present invention relates to a head tracking system (HTS). In particular the invention relates to testability and integrity of the Inertial tracking system. Hybrid tracking is used to describe an HTS operating utilising both optical and inertial tracking together. Coasting is used to describe operating in inertial only tracking. Degradation of the coasting orientation performance caused by the drift over time/temperature and other environmental factors of current inertial measurement units (IMUs) means that the typically useable time of coasting (in a highly dynamic environment) can be limited to just a short period of time. This is because the accuracy of coasting orientation data may exceed the specified accuracy required for the specific application under certain combinations of dynamic conditions. The invention addresses determining the Inertial tracking performance whilst in hybrid tracking, during coasting and when transitioning from coasting back to hybrid tracking. The IMU measurement is also compared to Optical Tracking data (when available) to ensure that the system operates in a state of minimal errors thereby ensuring enhanced integrity operation of the HTS.

Hybrid tracking uses both the primary tracking system and the head mounted IMUs to perform orientation tracking when the primary tracking source is available. In general, the primary tracking system is an optical system, but could be magnetic or other tracking technology that can provide consistent absolute measurement of head position and orientation over the dynamic operational conditions.

The head tracking orientation drop off in performance once in coasting is a limiting factor and drives the need to maintain good optical coverage over a large head motion box within the cockpit or other space for head tracking. This drives the need for potentially more sensors, emitters and/or references within the cockpit (or other space for head tracking) and a greater number of tracker optical sensors, emitters and/or references on the head assembly that adds mass and complexity which would be undesirable.

The present invention instead can tend to enhance the useable time and together with continuous monitoring of performance can tend to allow the coasting period to be extended and mitigate the drop off in orientation tracking performance.

Figure 1:
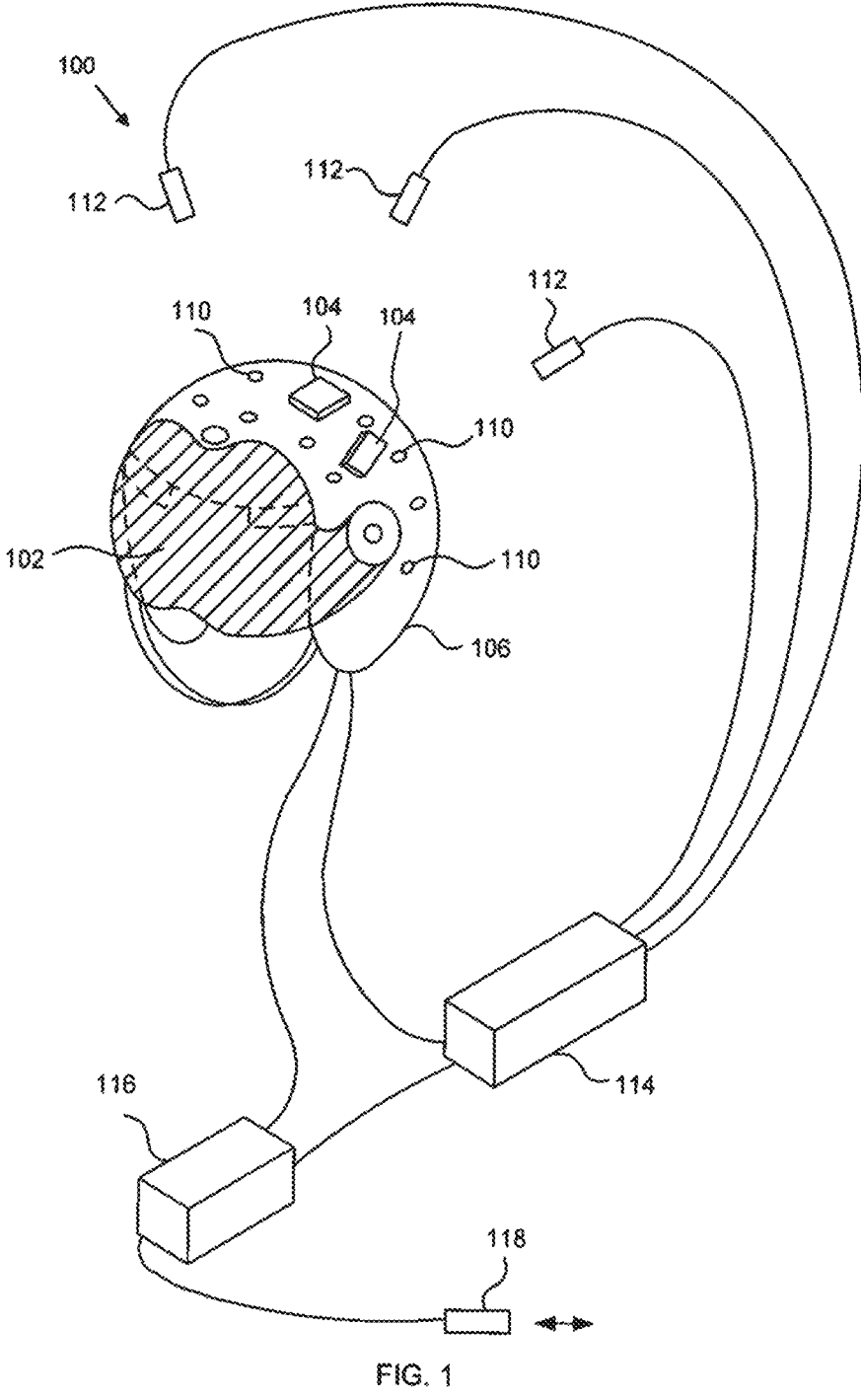
FIG. 1 shows an overview of a head tracking system incorporated within a helmet mounted display assembly, according to the present invention.

Referring to FIG. 1, a head tracker system (HTS) 100 is shown integrated with a helmet 102.

The HTS 100 comprises a number of inertial sensors fitted to the shell of the helmet 106 and an optical head tracker system.

Each inertial sensor is in the form of an IMU 104 containing three gyros (gyroscopes), which are nominally orthogonal to one another. At least one gyro in one IMU is configured to measure a first parameter, and at least one gyro in at least one other IMU is configured to measure the same or equivalent parameter. Hence comparisons may be made between the gyros/IMUs.

In other embodiments, the number of IMUs 104 and the number of gyros per IMU may vary. Provided there are three orthogonal gyros (e.g. X, Y and Z-axis aligned), the head position and orientation can be tracked, albeit with coasting errors. Provided there is some redundancy between the total gyros across all IMUs (e.g. there are four gyros two of which are aligned with one of the X, Y or Z axis) then comparisons can be made to help determine coasting errors.

The optical section of the head tracker system 100 comprises an arrangement of LEDs 110 integrated within or mounted upon the external shell of the helmet 106 and an arrangement of one or more optical sensors 112, such as cameras, each mounted at a fixed position in the vicinity of the helmet, e.g. within an aircraft cockpit or other vehicles, such they have visibility of at least some of the LEDs 110 at any likely orientation of the helmet 102. The invention is not limited to LEDs but instead is able to use any other appropriate light elements or markers.

In alternate embodiments, the optical sensors could be mounted on the head worn assembly or helmet, with the light elements or markers mounted in the vicinity (e.g. mounted on a cockpit surface).

A head tracker system controller 114 is linked to each of the optical sensors 112 to receive image data resulting from the detection of light emitted by the LEDs 110 within the camera's field of view and is also linked to the LEDs 110 in the helmet 102 such that it may control the illumination of the LEDs 110. The controller 114 is arranged, for example, to trigger a cyclic illumination of the LEDs 110 in predetermined patterns, to receive the resultant image data from the optical sensors 112. The controller 114 includes a digital processor programmed to illuminate the LEDs 110 and to interpret the resultant image data from the optical sensors 112 to determine helmet orientation and/or position relative to a frame of reference associated with the aircraft, in this example.

The head tracker system controller 114 also receives rate data output from the helmet mounted gyros (IMU) 104 and rate data from the aircraft inertial navigation system (not shown), via an interface 118. These data are combined with the optical measurements to produce head orientation and/or head position. The head tracker system controller 114 is also configured to output predicted measures of head orientation.

The processing module or processor 116 receives the head orientation and/or head position data output from 114, aircraft orientation and aircraft position data from the aircraft inertial navigation system (not shown) and generates world-stabilised images for presentation to the user via a display (not shown) integrated within the head mounted display assembly 102.

The head orientation and/or head position data output from 114 may also be output to the aircraft system, via interface 118.

Figure 2:
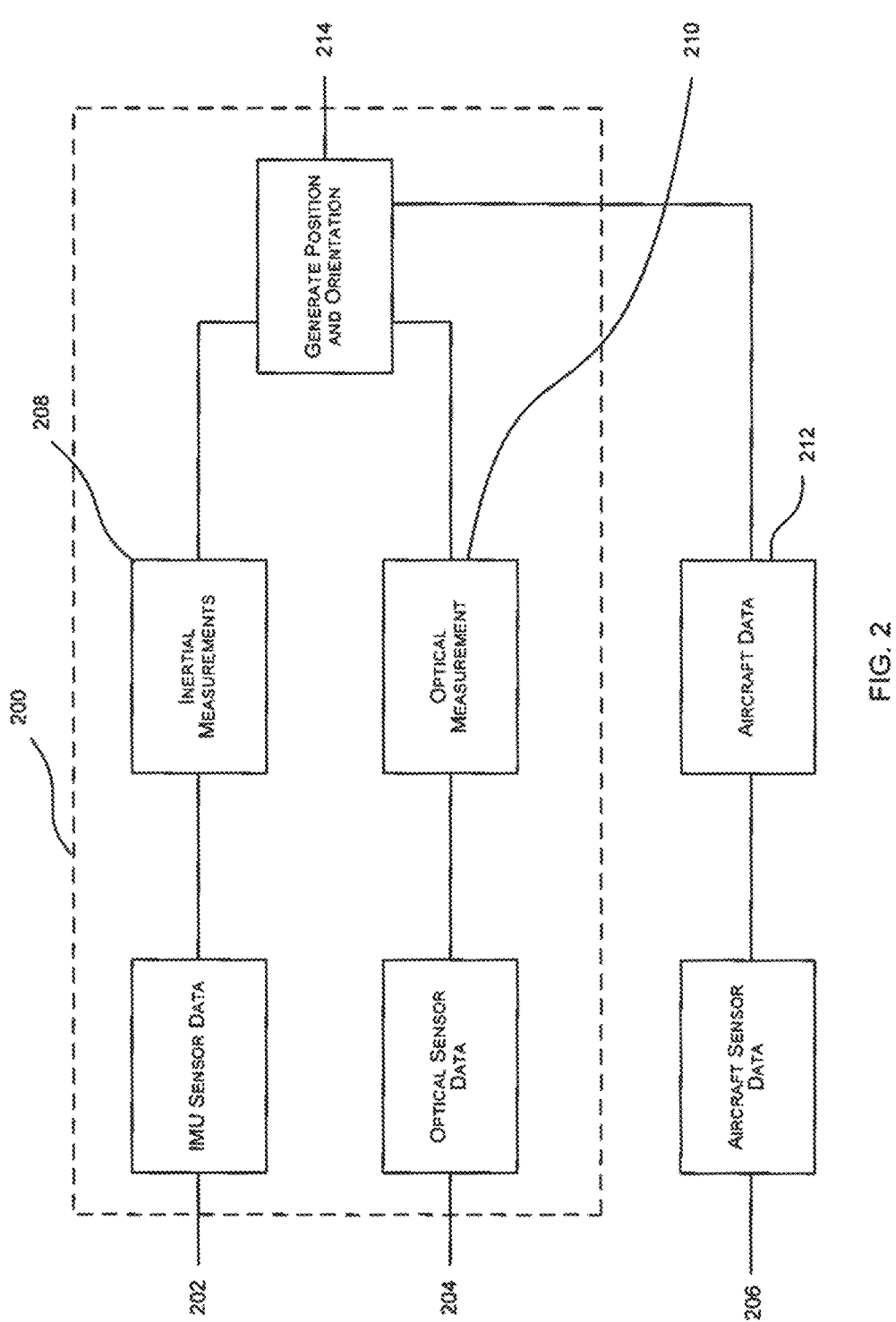
FIG. 2 shows a simplified block diagram of the FIG. 1 system.

FIG. 2 shows a block diagram of a hybrid HTS 200 for determining head orientation and head position relative to a predetermined location, such as an aircraft cockpit. The HTS 200 receives sensor data from two or more helmet mounted IMUs (each IMU comprising three or more gyros) 202; an optical sensor HTS 204 and an aircraft navigation system 206. The HTS includes an optical tracking system taking optical measurements and outputting an optical tracking state as well as an inertial tracking system taking inertial measurements and outputting an inertial tracking state. Where an optical tracking solution is available the optical tracking state is valid. Where an optical tracking solution is unavailable the optical tracking state is invalid. Similarly, where an inertial tracking solution is available the inertial tracking state is valid. Where an inertial tracking solution is unavailable the inertial tracking state is invalid.

Each of the two or more IMUs 202 includes a plurality or number of (e.g. three) miniature gyroscopes (gyros), each associated with a respective one of three nominally orthogonal gyro axes. The axes enable determination of yaw, pitch and roll. Each gyro is able to sense a rate of change in orientation of the system of helmet-mounted gyros 104 in inertial space, resolved along its respective gyro axis. The system can determine the rate of change in orientation of the helmet sensed by the individual gyros about their respective gyro axes. These are referred to as inertial measurements and are collected at 208.

The system provides that at least two gyros or at least two IMUs measure the same or an equivalent parameter such that comparisons can be made.

The optical HTS 204 includes the LEDs 110 on the helmet and the optical sensors 112 in the vicinity of the helmet as described in FIG. 1. The data collected by the optical sensors enables the exact position and orientation of the helmet to be identified. These are referred to as optical measurements and are collected at 210.

The aircraft navigation system 206 provides multiple types of information relating to the aircraft and the environment supplied by any relevant sensor used by aircraft to provide information. This is termed aircraft data and is collected at 212.

The combination of the IMU measurements, the optical measurements and optionally the aircraft measurements are used to determine the exact position and orientation of the head display assembly in space 214. The position and orientation are used to determine how to present images to the user and/or provided for use by other external systems (e.g. steer an aircraft sensor). The images being a combination of real world images and virtual images, such as symbology or the like. The real world images come from the view seen by the user. The virtual image is based on sensor data relevant to the operation and circumstance of operation of the vehicle. This may be combined and presented to the user. The presentation of certain virtual images (such as compass headings or other symbology anchored to external objects) is based on the position and orientation of the user which is provided by the HTS 200.

The HTS 200, as previously stated, is a hybrid system and ideally combines optical and inertial measurements. Depending on head pose, optical measurements are sometimes unavailable, and the system continues by using the inertial measurements only (also referred to as coasting). During inertial only tracking, the system is reliant on the correct operation of the inertial measurement unit (IMU). In addition, when inertial only tracking the error in the orientation calculation will slowly increase with time due to the intrinsic characteristics of IMUs and external factors.

As a result there is a potential hazard risk based on coasting errors. The correct functioning of the IMU and the build-up of error with time needs to be determined in real time.

During coasting operation an orientation error generated using measurements from each IMU will increase overtime as all IMUs drift. This variation between the separate orientations calculated from each IMU are used to ascertain when the coasting errors are too great to provide an adequate space stabilised display to the user. This variation could be used as a figure of merit to blank space stabilised symbology selectively dependent on the accuracy requirements of individual symbology functions and their associated accuracy needs.

Having multiple IMUs can help by firstly using data from all IMUs that will average out some of the individual IMU errors. In addition, if the IMUs are orientated in different axes within the helmet this will allow any IMU accuracy variations between axes to be understood and to some extent corrected.

Merging of the data can be accomplished in a number of ways:

In a first method, an average of the IMU measurements from the gyros is determined and the average IMU measurements is treated as if it came from one IMU. This improves performance but other issues remain.

In a second method each IMU is processed in parallel and generates two orientation results. This would allow the results to be directly compared whilst coasting to confirm to a reasonably high degree of confidence that the IMUs are providing valid results. The two final orientation results would be merged to provide an improved orientation output. This also gives performance improvements.

A third method is a combination between the first two methods. The main calculation of orientation proceeds as in the first method and a secondary monitor system checks the individual outputs of the gyros.

A fourth method compares the IMU measurements and the optical measurements and is described in greater detail below.

The abovementioned methods will now be described in detail with reference to FIG. 3. The HTS 200 includes the following process 300 to increase safety and mitigate some of the errors inherent in HTS. The HTS uses three orthogonally mounted gyros, contained in at least one IMU 104. Other numbers of IMU and gyros per IMU could also be used.

In block 302 the system processes and compares the IMU measurements. This outputs an average IMU rate and a failure notification (IMU failure 1) if any of the IMUs are not working or working incorrectly. The IMU measurements are passed to tracking state block 304.

The HTS continually runs through a measurement cycle. For each cycle the optical section of the HTS takes a set of optical measurements and the inertia section takes a set of IMU measurements (for example, comprising 3 sets of data for each of the 3 orthogonal gyros).

The tracking state block 304 determines the current tracking state of both the optical and inertial trackers. Where the tracking state block determines that an optical solution can be obtained 306, in other words that the optical tracking state is valid, a comparison of the IMU and optical measurements are made at block 310. The comparison is based on the average IMU rates and the optical tracking. If there is an appreciable error in the comparison an IMU failure (IMU failure 2) is generated. As shown in block 312 if there is any IMU failure (IMU failure 1 from 302 or IMU failure 2 from 310) there is an overall IMU failure and optical tracking only can be relied upon. The optical measurements either with or without IMU measurements are processed in block 314 to generate a hybrid calculated orientation output 316.

In some cases, an estimated IMU error 318 is determined and an estimate of gyro coasting error 320 is made. If the coasting is valid 322 gyro coasting processing 324 takes place to generate gyro coasting calculated orientation output 326.

If both optical tracking and gyro coasting are working the HTS has the IMU and the optical measurements to identify orientation and position and if necessary, can make comparisons to ensure the system is not going to degenerate in any way that would lead to invalid tracking and risk to operators and others. The comparisons of the state of optical tracking and inertial tracking can lead to indicating a safety level of the HTS which is compared with predetermined known safety levels to confirm the HTS is operating normally and safely. The required safety level is based on a predetermined tracking performance required by the application or HTS.

If there is no optical tracking the HTS can only rely on IMU measurements and the system is coasting. During coasting, the gyro only data is used.

As previously indicated coasting gives rise to a build-up of errors. This error build-up is a combination of the errors in the estimated gyros biases, the random drift and noise of the gyros and the gyro gain, alignment errors and external factors such as the quality and latency of the aircraft data.

Figures 4A, 4B:
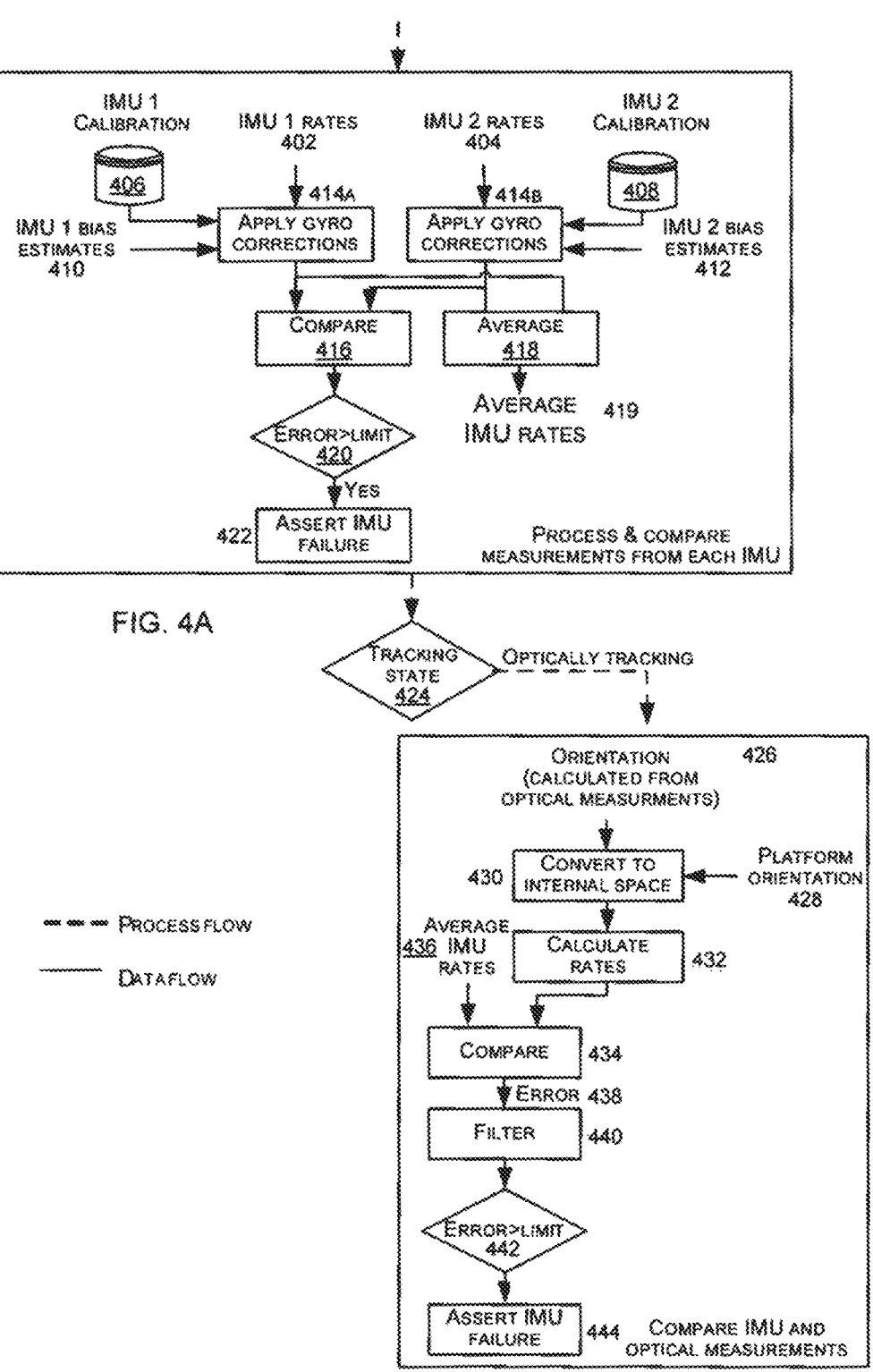
FIG. 4a is a flow diagram showing a process for comparing measurements from inertial measurement units.
FIG. 4b is a flow diagram showing a process for comparing measurements from inertial measurement units and optical sensors.

In order to mitigate the coasting errors the present invention provides a processing of comparing the IMU measurements from each IMU as shown in FIGS. 4a and 4b. It should be noted that only two measurements are shown to be compared, but the process could use other numbers of IMU rates.

Figure 3:
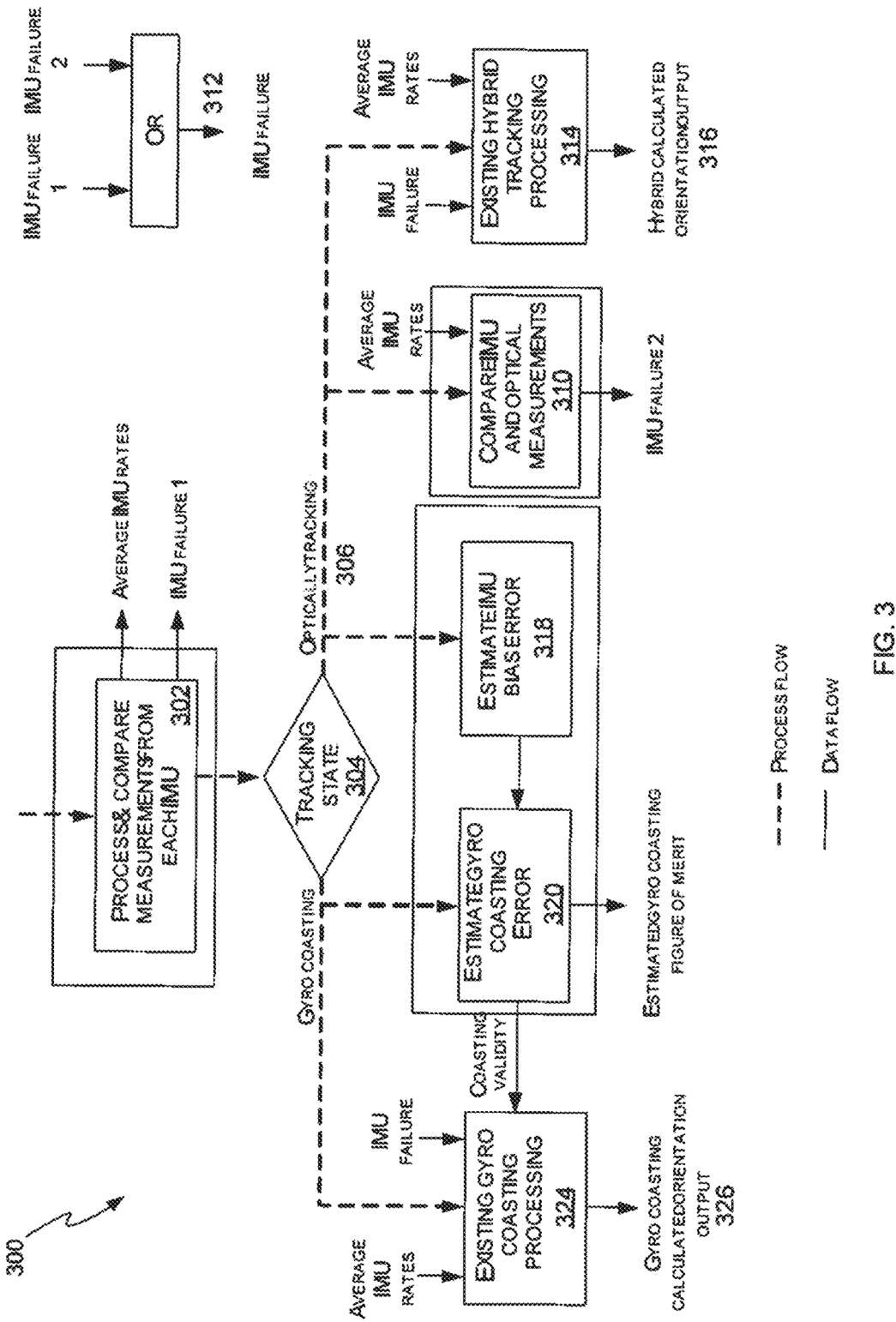
FIG. 3 shows a block diagram of a system for reducing errors in head tracking systems according to the present invention.

FIGS. 4a and 4b set out a more detailed implementation of the process for comparing the measurement from each IMU in block 302 of FIG. 3 and the process for comparing IMU and optical measurements 310 of FIG. 3.

In FIG. 4 the first 402 and second 404 IMU rates are received along with respective calibration 406, 408 and respective bias estimates 410, 412. The values are passed to respective gyro correction modules 414A and 414B. The output from the gyro correction modules 414A and 414B are compared 416. The compared error is compared with a limit 420. If the error is greater that the limit the system asserts IMU failure 1 422. The difference between the error and the limit can be used to give a figure of merit (FOM) of the or each tracking system. The figure of merit provides a more granular indication of the validity or invalidity of the tracking system. This is then able to determine operations available to the user based on the FOM.

The output from the gyro correction modules 414A and 414B are also averaged 418 to determine the average IMU rates 419.

At the tracking state 424 module, the validity of the optical tracking is checked. If the optical tracking is deemed valid, then the system may proceed to compare the optical tracking with the IMU tracking. Such comparison may indicate an IMU failure.

Referring to FIG. 4b there is a comparison of optical and inertial measurements. The compared error is compared with a limit 442. If the error is greater that the limit the system asserts IMU failure 2 444 The optical measurements 426 and a platform orientation 428 are used to convert measurements to an inertial space 430 and a rate is calculated 432. This is then compared 434 with average IMU rates 436, as determined above this produces an error 438. This error is then filtered 440 and compared to an error limit 442. If the error is greater than or equal to a threshold or limit the system asserts an IMU failure 2 444. The IMU measurement data can continue to be checked against the optical measurement but is not used in the computation of position and orientation unless it is confirmed to have recovered to the valid state.

The ideal situation is that optical and inertial measurements are both available to the HTS. As described above this is not always the case. The present invention has provided a means of comparing measurements to optimise the confidence in the inertial and optical tracking.

If both inertial tracking and optical tracking are identified as operational the HTS is operating safely, and the system is flagged as fully operational. If one or other of the inertial tracking and optical tracking are identified as non-operational, this system is flagged as potentially failing and monitoring is intensified until the system is flagged as fully operational or failed. If both inertial tracking and optical tracking are identified as non-operational the system is flagged as failed and remedial action is required.

There are a number of additional processes the invention proposes to further improve the confidence in the HTS.

A further set of comparisons is based on continually monitoring the optical measurements and the IMU measurements as either optical or inertial tracking is regained. In the case of regaining the optical system this requires a direct measure of the IMU errors over the period of coasting. By monitoring the regain of control by either tracking system and additional level of confidence is gained in the return to normal operation is better understood.

The values of optical measurements and inertial measurements are used to determine a training set of data for a machine learning analysis of real time data. This includes data from the abovementioned regain of tracking. A deep neural network (DNN) is trained with optical measurements and inertial measurements to identify conditions which lead to loss of either or both of inertial and optical tracking. Then feeding real time data through the DNN will trigger an early warning that one or both tracking systems are likely to fail. The effect is to initiate remedial measures as early as possible.

Another enhancement is to add localised IMU temperature readings as these aid in the corrections and identification of errors.

Accurate tracking as provided for here can enable systems to present symbology to the user at the right time and location in their field of view. In particular it can enable symbology to appear aligned or anchored to real world objects beyond the helmet. For example a virtual 'N' may hover over a northerly bearing, or a virtual waypoint marker may appear on a flight path, or a virtual ring may surround and thereby highlight a region of a dashboard. If an accurate head position and/or orientation cannot be determined, any presentation of symbology that is supposed to be anchored to real world objects can become misaligned, and thus may lead the user to errors and accidents.

The comparison of optical and inertial tracking enable the system to selectively control the presentation of information dependent on the accuracy required for that particular symbology. As mentioned above different types of symbology are enabled or not depending on the value of the comparison. Where symbology need not be aligned or anchored to an external real world object, it may continue to be presented regardless of whether accurate head tracking is possible. For example a digital odometer, could always be presented top left of the user's view, regardless of where the user's head was facing.

Symbology can include at least one or more of the following:

Signs and symbols
Data from sensors
Processed data from sensors
Combinations of sensor data
Military symbology
Vehicle related symbology
Scene related symbology
Location and positioning symbology
Map symbology
Speed and velocity symbology It will be appreciated the description of the invention as described above will have many variations and alternatives that will be evident to the skilled person.

The invention claimed is:

1. A head tracking system (HTS), configured to determine a head position and a head orientation of a user to which display images are configured to align with the outside world scene and are configured to be presented, the HTS comprising:

an optical sensor configured to generate an optical measurement;

two or more inertial sensors each configured to generate an inertial measurement; and a processor configured to determine the head position and the head orientation based on one or both of the optical sensor and the inertial sensor, the processor configured to determine an optical tracking state from the optical measurement and an inertial tracking state from the inertial measurement, responsive to both the optical tracking state and the inertial tracking state being valid, flagging/asserting HTS operation as normal, responsive to both the optical tracking state and the inertial tracking state being invalid, flagging/asserting HTS failure, and responsive to the optical tracking state and the inertial tracking state being valid, comparing the optical measurement and the inertial measurement to determine if the HTS can operate safely based on a predetermined tracking performance required by the HTS, wherein the processor is further configured to compare the respective inertial measurements of the two or more inertial sensors, in a coasting mode when the optical measurement is unavailable, to determine if the inertial measurements give rise to a failure, and responsive to the inertial measurement giving rise to the failure, generate a calculated head position and head orientation of the user based only on the optical measurement when the optical measurement is available.

2. The head tracking system HTS according to claim 1, wherein comparing the optical measurement and the inertial measurement comprises determining data associated with the inertial measurement to identify if the inertial sensor has failed.

3. The head tracking system HTS according to claim 2, wherein the processor is configured to receive inertial measurements from the two or more inertial sensors and use the inertial measurements, to identify inertial sensor failure.

4. The head tracking system HTS according to claim 2, wherein if the inertial measurements do not give rise to a failure, combining a combination of the inertial measurements with the optical measurement to generate the calculated head position and head orientation of the user based on the optical measurement and the inertial measurement.

5. The head tracking system according to claim 1, wherein the each of the two or more inertial sensors is one of three or more gyroscopes located on a head worn assembly associated with the HTS.

6. The head tracking system according to claim 1, wherein the optical sensor is in the vicinity of the HTS and is configured to receive optical measurement data from one or more light elements located on a head worn assembly associated with the HTS.

7. The head tracking system according to claim 1, configured to receive one or more measurements from sensors associated with a vehicle in which the HTS is used.

8. The head tracking system according to claim 1, configured to notify a vehicle control system that both the optical tracking state and the inertial tracking state are invalid.

9. The head tracking system according to claim 1, incorporated into a head worn assembly such as a helmet.

10. A head worn assembly configured to present display images aligned with an outside world scene to a user based on a head position and a head orientation provided by the HTS of claim 1.

11. The head worn assembly of claim 10, further including an optical display to display images aligned with the outside world scene to a user wearing the head worn assembly, wherein the presentation of at least a virtual image is based on the optical tracking state and the inertial tracking state.

12. The head worn assembly of claim 11, wherein the optical display comprises at least one of a visor-projection display system, and a waveguide-based display, arranged to present virtual images such that they appear overlaid with a real world image through a visor or waveguide which forms part of the head worn assembly.

13. A method to determine a head position and a head orientation of a user to which display images are configured to align with the outside world scene and are configured to be presented, the method comprising:

determining an optical tracking state from an optical measurement generated by an optical sensor and an inertial tracking state from an inertial measurement generated by two or more inertial sensors;

responsive to both the optical tracking state and the inertial tracking state being valid, flagging/asserting HTS operation as normal;

responsive to both the optical tracking state and the inertial tracking state being invalid, flagging/asserting HTS failure;

responsive to one of the optical tracking state and the inertial tracking state being valid comparing the optical measurement and the inertial measurement to determine if the HTS can operate safely based on a predetermined tracking performance required by the system;

comparing the respective inertial measurements of the two or more inertial sensors, in a coasting mode when the optical measurement is unavailable, to determine if the inertial measurements give rise to a failure, and responsive to the inertial measurement giving rise to the failure, generating a calculated head position and head orientation of the user based only on the optical measurement when the optical measurement is available.

14. The method according to claim 13, wherein comparing the optical measurement and the inertial measurement comprises determining data associated with the inertial measurement to identify if sensor failure is present.

15. The method according to claim 14, comprising receiving multiple inertial measurements and determining the inertial measurements from the two or more inertial sensors and using the inertial measurements, to identify if any of the two or more inertial sensors has failed.

16. The method according to claim 14, wherein if the inertial measurement does not give rise to a failure, combining the inertial measurement with the optical measurement to generate the calculated head position and head orientation of the user based on the optical measurement and the inertial measurement.

17. The method according to claim 13, wherein the inertial measurement is received from three or more gyroscopes located on a head worn assembly associated with the HTS.

18. The method according to claim 13, wherein the optical measurement is received from one or more optical sensors in the vicinity of the HTS, the one or more optical sensors being configured to receive optical measurement data from one or more light elements located on a head worn assembly associated with the HTS.

19. The method according to claim 13, comprising receiving one or more measurements from sensors associated with a vehicle in which the HTS is used.

20. The method according to claim 13, comprising notifying a vehicle control system that both the optical tracking state and the inertial tracking state are invalid.

\* \* \* \* \*